(12) United States Patent
Niiyama et al.

(10) Patent No.: US 6,937,218 B2
(45) Date of Patent: Aug. 30, 2005

(54) METHOD FOR DRIVING A LIQUID CRYSTAL DISPLAY DEVICE

(75) Inventors: Satoshi Niiyama, Kanagawa (JP); Tomohiro Takano, Kanagawa (JP); Shinya Tahara, Kanagawa (JP)

(73) Assignee: OPTREX Corporation, Tokyo (JP)

( * ) Notice: Subject to any disclaimer, the term of this patent is extended or adjusted under 35 U.S.C. 154(b) by 474 days.

(21) Appl. No.: 10/246,535

(22) Filed: Sep. 19, 2002

(65) Prior Publication Data

US 2003/0067431 A1 Apr. 10, 2003

(30) Foreign Application Priority Data

Sep. 19, 2001 (JP) ........................................ 2001-285979
Sep. 27, 2001 (JP) ........................................ 2001-297783

(51) Int. Cl.$^7$ ................................................ G09G 3/36
(52) U.S. Cl. ........................................................ 345/87
(58) Field of Search ........................................... 345/87

(56) References Cited

U.S. PATENT DOCUMENTS 5,627,559 A * 5/1997 Tsuboyama et al. ........... 345/97
5,734,379 A * 3/1998 Natsumi et al. ............. 345/211
6,304,239 B1 * 10/2001 McKnight ..................... 345/87
6,747,622 B2 * 6/2004 Takahashi et al. ............. 345/87
2002/0063669 A1 * 5/2002 Yanagi et al. ................. 345/87
2004/0160398 A1 * 8/2004 Yokota et al. ................. 345/87

FOREIGN PATENT DOCUMENTS

EP          0 478 382         4/1992
WO          WO 00/52671       9/2000

* cited by examiner

Primary Examiner—Michael Razavi
Assistant Examiner—Motilewa Good-Johnson
(74) Attorney, Agent, or Firm—Oblon, Spivak, McClelland, Maier & Neustadt, P.C.

(57) ABSTRACT

When a new image is written to a liquid crystal panel, row electrodes are scanned a-line-at-a-time in time periods $T_{p1}$, $T_{p2}$, selected row electrodes are set at a voltage $V_r$, and all column electrodes are set at $-V_c$. The portions of a liquid crystal at the selected row electrodes have a voltage of $V_r + V_c$ applied thereacross to bring the liquid crystal in the entire screen into a planar state. After the portions of the liquid crystal at all pixels have been brought into the planar state, new display is written by a-line-at-a-time scanning in time periods $T_{d1}$, $T_{d2}$.

20 Claims, 9 Drawing Sheets

|  |  | Combination 1 | Combination 2 | Combination 3 | Combination 4 |
|---|---|---|---|---|---|
| Parameter | An (Scan number) | 1 | 4 | 2 | 2 |
|  | Av (Vrms) | 20 | 18 | 20 | 18 |
|  | At (ms) | 20 | 10 | 20 | 20 |
|  | Bn (Scan number) | 1 | 2 | 0 | 0 |
|  | Bv (Vrms) | 12 | 10 | - | - |
|  | Bt (ms) | 20 | 10 | - | - |
|  | Wn (Scan number) | 1 | 4 | 2 | 2 |
|  | Wt (ms) | 20 | 10 | 20 | 10 |
| Measurement | Time period of re-writing display (sec.) | 14.4 | 24 | 19.2 | 14.4 |
|  | Contrast | 8 | 7 | 6 | 10 |
|  | Afterimage | Non | Non | Non | Non |

Selection time periods At, Bt, Wt are expressed in msec.

- 1A: Glass substrate
- 2A: Electrode
- 3A: Polymer thin film
- 4: Liquid crystal composition
- 3B: Polymer thin film
- 2B: Electrode
- 1B: Glass substrate
- 5: Light absorbing member

- 11: Controller
- 12: Row driver
- 13: Column driver
- 14: Liquid crystal power source
- 100: Liquid crystal panel

FIG. 8

| Parameter | | Combination 1 | Combination 2 | Combination 3 | Combination 4 |
|---|---|---|---|---|---|
| | An (Scan number) | 1 | 4 | 2 | 2 |
| | Av (Vrms) | 20 | 18 | 20 | 18 |
| | At (ms) | 20 | 10 | 20 | 20 |
| | Bn (Scan number) | 1 | 2 | 0 | 0 |
| | Bv (Vrms) | 12 | 10 | - | - |
| | Bt (ms) | 20 | 10 | - | - |
| | Wn (Scan number) | 1 | 4 | 2 | 2 |
| | Wt (ms) | 20 | 10 | 20 | 10 |
| Measurement | Time period of re-writing display (sec.) | 14.4 | 24 | 19.2 | 14.4 |
| | Contrast | 8 | 7 | 6 | 10 |
| | Afterimage | Non | Non | Non | Non |

Selection time periods At, Bt, Wt are expressed in msec.

| | | Combination 1 | Combination 2 |
|---|---|---|---|
| Parameter | Wn (Scan number) | 1 | 4 |
| | Wt (ms) | 20 | 20 |
| Measurement | Time period of re-writing display (sec.) | 4.8 | 19.2 |
| | Contrast | 4 | 6 |
| | Afterimage | Exist | Exist |

The selection time period Wt is expressed in msec.

| Setting selection time period | At=Wt | At=1.3·Wt | At=2.0·Wt |
|---|---|---|---|
| Contrast | 6 | 7.5 | 10 |
| Permissible operational voltage | 0.5V | 0.8V | 1.3V |

F I G . 12
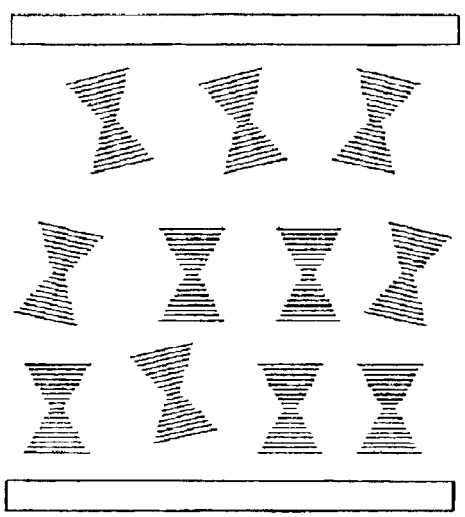
(a)
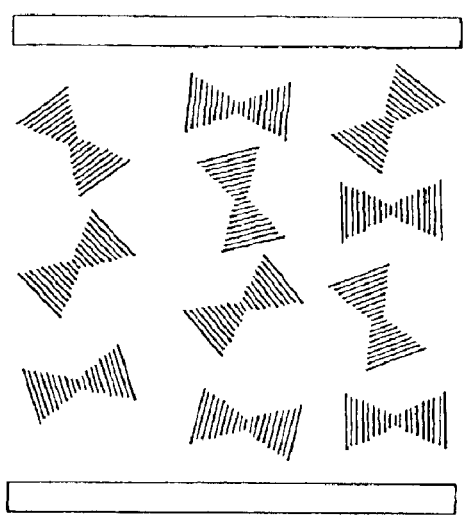
(b)

METHOD FOR DRIVING A LIQUID CRYSTAL DISPLAY DEVICE

The present invention relates to a method for driving a liquid crystal display device including a liquid crystal developing a memory effect.

At the present time, TN, STN or TFT liquid crystal display elements have been widely utilized. The liquid crystal display elements are constantly driven in a certain mode to provide display. On the other hand, liquid crystals developing a memory effect, such a cholesteric liquid crystal or chiral nematic liquid crystals having a drive mode developing a memory effect, have attracted attention, and the practical application of liquid display devices including that sort of liquid crystal has been investigated.

A liquid crystal developing a memory effect, which is sandwiched between a pair of transparent substrates, has a twisted structure that its director twists at a certain cycle. There is an alignment that the central axes of the twisted director (called the helical axes) are averagely aligned perpendicular to the substrates.

The state wherein the average direction of the helical axes of a plurality of liquid crystal domains is substantially perpendicular to the substrate surfaces is called a planar state. In the planar state, circularly polarized light that corresponds to the twisted direction of the liquid crystal layer is selectively reflected among incident light. The selectively reflected wavelength $\lambda$ is nearly equal to the product of the average refractive index $n_{AVG}$ of a liquid crystal composition and the pitch P of the liquid crystal composition ($\lambda = n_{AVG} \cdot p$).

The pitch p is determined according to the formula of $p = 1/(c \cdot HTP)$ based on the adding amount C of a optically active material, such as a chiral agent, and the constant of the optically active material HTP (Helical Twisting Power). This means that the kind of the optically active material and the adding amount thereof can be adjusted to control the selectively reflected wavelength. When the pitch is set such that the selectively reflected wavelength of a liquid crystal developing a memory effect is out of the visible range, the liquid crystal becomes visually transparent, being in a drive mode of transmittance-scattering.

Besides the planar state wherein the selective reflection is given, there is available a focal conic state wherein the helical axes of a plurality of liquid crystal domains face in random directions or in a non-perpendicular direction to the substrate surfaces. Generally speaking, a liquid crystal layer in the focal conic state has a weakly scattering state as the whole. In this state, there is no phenomenon that light having a specific wavelength is reflected as in the selective reflection. The focal conic state and the planar state exist in stable fashion even with no electric field applied.

FIG. 12(a) is a schematic view of a planar state, FIG. 12(b) is a schematic view of a focal conic state, and both views show the arrangement of liquid crystal domains depicted in a drum shape.

In the focal conic state shown in FIG. 12(b), an absorbing layer can be provided on a rear side to display in the color of the absorbing layer. Two states of the planar state as a bright state and the focal conic state as a dark state (in the case of the absorbing layer being black) can be utilized to realize display action developing a memory effect.

The basic structure of liquid crystal display devices has been described in George H. Heilmeier, Joel E. Goldmacher et al. Appl. Phys. Lett., 13(1968), 132 or U.S. Pat. No. 3,936,815. U.S. Pat. No. 4,097,127 discloses that there is a stable intermediate state with the planar state and the focal conic state mingled, and that the stable intermediate state can be applied to display.

Now, a method for driving a liquid crystal display device will be explained. In U.S. Pat. No. 3,936,815, depending on the amplitude of a driving voltage, the planar state is changed into the focal conic state or the focal conic state is changed into the planar state. The latter case needs the highest voltage since the change is made via a homeotropic state wherein liquid crystal molecules are aligned substantially parallel with the applied direction of the voltage.

In the case of liquid crystals developing a memory effect, the effective values of the waveforms of a series of applied voltages do not directly determine the state after voltage removal. The display after voltage removal depends on the application time period and the amplitude value of a voltage pulse applied immediately before.

Now, the matrix display in liquid crystal display devices will be explained. It is assumed that $V_F$ is a voltage capable of causing transition into the focal conic state, $V_P$ is a lower limit voltage capable of causing transition into the planar state, and $V_s$ is an upper limit voltage, at which no change is made in display even when a voltage is applied.

When a-line-at-a-time addressing is performed, a voltage pulse having a voltage amplitude of $V_r$ is inputted into row electrodes, and a voltage pulse (selection pulse) having a voltage amplitude of $V_c$ is inputted into column electrodes in synchronism with the inputting into the row electrodes. One display sequence is completed by inputting the selection pulse into the respective row electrodes one by one. In the display sequence, when ON-display is selected, a voltage amplitude of $(V_r + V_c)$ is inputted into a display pixel only one time, and while ON-display is not selected, the voltage of $V_c$ is applied. When OFF-display is selected, a voltage amplitude of $(V_r - V_c)$ is inputted into a display pixel only one time, and while OFF-display is not selected, the voltage of $V_c$ is applied. When the planar state is selected on ON-display, and the focal conic state is selected on OFF-display, the following conditions should be satisfied:

$$V_r + V_c > V_p, \quad V_r - V_c = V_F$$

In addition, the condition of $V_c < V_s$ is satisfied to prevent a written state from changing. The matrix display can be carried out by controlling applied voltages as stated earlier.

Even when the number of electrodes to scan in a liquid crystal display device increases, the quality of display in a state with display data written will not degrade. An increase in the number of electrodes does not lead to an increase in a driving voltage.

In the liquid crystal display devices, a voltage does not need to be applied all the time in order to continue display since display after voltage removal depends on the application time period and the amplitude value of a voltage pulse applied immediately before. However, when the liquid crystal display devices are left for a long time, there is caused a phenomenon that when new display data are written, the previous displayed state remains as an afterimage. It is desirable that it is possible to write new display data without leaving that sort of afterimage.

The row electrodes and the column electrodes have voltage pulses inputted thereinto by respective driving ICs (a row driver and a column driver). The driving ICs have necessary voltages supplied from a power source IC (liquid crystal power source). The driving ICs have a plurality of leads for operational amplifiers (hereinbelow, referred to as Op-Amp leads), and the driving ICs and the liquid crystal power source are connected together through variable resistors and the operational amplifiers (Op-Amps). The relationship among the respective Op-Amp leads of the driving ICs in terms of potential height needs to be maintained by setting certain potentials at the respective Op-Amp leads. However, when all row electrodes are simultaneously selected to apply a voltage across a liquid crystal developing a memory effect throughout the entire display screen at the time of driving the liquid crystal display device, the currents flowing through the driving ICs increase, making the loads to the driving ICs large. Specifically, the relationship among the respective Op-Amp leads of the driving ICs in terms of potential height cannot be maintained in some cases. When the driving ICs are fabricated so as to be able to maintain the relationship among the respective Op-Amp leads in terms of potential height even when large currents flow, it is supposed that the driving IC needs to be made larger, or the power consumption increases. The fabrication cost of the driving unit for a liquid crystal display will increase.

It is also desirable to realize a reduction in the time period required for rewriting display, simplification of the driving ICs, improvement in the contrast of rewritten display and the like.

It is an object of the present invention to solve the problems stated earlier and to provide a method for driving a liquid crystal display device, which is capable of new display data without leaving an afterimage and providing a heavy load to driving ICs.

According to a first aspect of the present invention, there is provided a method for driving a liquid crystal display device including a memory type liquid crystal layer that exhibits at least two stable states, a plurality of common electrodes and a plurality of segment electrodes.

wherein the common electrodes are scanned so as to be selected a-line-at-a-time, characterized in that An, Bn and Wn being determined such that $L \cdot (At \cdot An + Bt \cdot Bn + Wt \cdot Wn)$ is not longer than a certain time period, and the voltage for making said layer into on-display being set higher than the voltage for making said layer into off-display;

where L is a total number of the common electrodes,

At (sec) is a selection time period for each of the common electrodes when the voltage making said layer into on-display is applied to said layer, An is a scan number for applying the voltage for making said layer into on-display at least one time, scanning the common electrodes so as to select all common electrodes on by one, Bt (sec) is a selection time period for each of the common electrodes when the voltage for making said layer into off-display is applied to said layer, Bn is a scan number for applying the voltage for making said layer into off-display, Wt (sec) is a selection time period for each of the common electrodes when the voltage corresponding to a display data is applied to said layer, and Wn is a scan number for applying the voltage corresponding to a display data to said layer, an on-voltage to make said layer into on-display is set to be higher than an off-voltage to make said layer into off-display, an on-voltage is applied to said layer, and an off-voltage is applied to said layer, and a voltage corresponding to a display data is applied to said layer.

According to a second aspect of the present invention, $L \cdot (At \cdot An + Bt \cdot Bn + Wt \cdot Wn)$ is less than or equal to 60 seconds.

According to a third aspect of the present invention, $At = Bt = Wt$ is satisfied.

According to a fourth aspect of the present invention, wherein $An = Bn = Wn$ is satisfied.

According to a fifth aspect of the present invention, $Bn = 0$ is satisfied and off-voltage is not applied to said layer.

According to a sixth aspect of the present invention, $Bn = 0$ and $An = Wn$ are satisfied.

According to a seventh aspect of the present invention, $At \geq Wt$ is satisfied.

According to an eighth aspect of the present invention, $At \geq 1.2 Wt$ is satisfied.

According to a ninth aspect of the present invention, $At \geq 1.5 Wt$ is satisfied.

According to a tenth aspect of the present invention, Wn is 1.

According to a eleventh aspect of the present invention, Wn is 2.

According to a twelfth aspect of the present invention, An is 2 and Bn is 0 and Wn is 2.

According to a thirteenth aspect of the present invention, An is 1 and Bn is 1 and Wn is 1.

According to a fourteenth aspect of the present invention, An is 4 and Bn is 2 and Wn is 4.

According to a fifteenth aspect of the present invention, An is 1 and Bn is 0 and Wn is 2.

According to a sixteenth aspect of the present invention, An is 0 and Bn is 0 and Wn is from 4 to 16.

According to a seventeenth aspect of the present invention, said layer is comprised of a chiral nematic liquid crystal material.

According to a eighteenth aspect of the present invention, an visible wavelength is included in a selective-reflective region by said layer in planar state.

According to a nineteenth aspect of the present invention, an infrared wavelength is included in a selective-reflective region by said layer in a planar state.

According to a twentieth aspect of the present invention, an ultraviolet wavelength is included in a selective-reflective region by said layer in a planar state.

According to an embodiment of the present invention, there is provided a method for driving a liquid crystal display device including a liquid crystal developing a memory effect that exhibits at least two stable states, a plurality of common electrodes and a plurality of segment electrodes, wherein the common electrodes are scanned so as to be selected one by one, characterized in that it comprises applying a voltage for bringing the liquid crystal developing a memory effect into ON-display across the liquid crystal developing a memory effect, applying a voltage for bringing the liquid crystal developing a memory effect into OFF-display across the liquid crystal developing a memory effect, across which the voltage for brining the liquid crystal into ON-display has been applied, and then applying a voltage corresponding to display data across the liquid crystal developing a memory effect, across which the voltage for brining the liquid crystal into OFF-display has been applied; $A_n$, $B_n$ and $W_n$ being determined such that $L(A_t \cdot A_n + B_t \cdot B_n + W_t \cdot W_n)$ is not longer than a certain time period, and the voltage for bringing the liquid crystal developing a memory effect into ON-display being set higher than the voltage for bringing the liquid crystal developing a memory effect into OFF-display; where L is a total number of the common electrodes, $A_t$(sec.) is a selection time period for each of the common electrodes when the voltage for bringing the liquid crystal developing a memory effect into ON-display is applied across the liquid crystal developing a memory effect, $A_n$ is a scan number for applying the voltage for bringing the liquid crystal developing a memory effect into ON-display across the liquid crystal developing a memory effect by, at least one time, scanning the common electrodes so as to select all common electrodes one by one, $B_t$(sec.) is a selection time period for each of the common electrodes when the voltage for bringing the liquid crystal developing a memory effect into OFF-display is applied across the liquid crystal developing a memory effect, $B_n$ is a scan number for applying the voltage for bringing the liquid crystal developing a memory effect into OFF-display across the liquid crystal developing a memory effect, $W_t$(sec.) is a selection time period for each of the common electrodes when the voltage corresponding to display data is applied across the liquid crystal developing a memory effect, and $W_n$ is a scan number for applying the voltage corresponding to display data across the liquid crystal developing a memory effect.

According to a second embodiment of the present invention, there is provided a method for driving a liquid crystal display device, wherein $A_t = B_t = W_t$ is satisfied. In accordance with the driving method in this mode, it is possible to simplify the driving unit.

According to a third embodiment of the present invention, there is provided a method for driving a liquid crystal display device, wherein $A_n = B_n = W_n$ is satisfied. In accordance with the driving method in this mode, it is possible to simplify the driving unit.

According to a fourth embodiment of the present invention, there is provided a method for driving a liquid crystal display device, wherein $B_n = 0$ is satisfied.

According to a fifth embodiment of the present invention, there is provided a method for driving a liquid crystal display device, wherein $B_n = 0$ and $A_n = W_n$ are satisfied. In accordance with the driving method in this embodiment, it is possible to simplify the driving unit.

According to a sixth embodiment of the present invention, there is provided a method for driving a liquid crystal display device, wherein $A_t \geq W_t$ is satisfied. In accordance with the driving method in this embodiment, it is possible to improve contrast and to increase an allowable operating voltage.

According to a seventh embodiment of the present invention, there is provided a method for driving a liquid crystal display, wherein $A_t \geq 1.2 \cdot W_t$ is satisfied. In accordance with the driving method in this embodiment, it is possible to further improve the contrast and to further increase the allowable operating voltage.

According to an eighth embodiment of the present invention, there is provided a method for driving a liquid crystal display, wherein $W_n$ is 1 or 2. In accordance with the driving method in this embodiment, it is possible to shorten a time period required for completion of rewriting display.

In drawing:

FIG. 8 is a Table showing the set parameters and the measurements in Examples;

FIG. 12 is a schematic view of showing an example of the orientational order in a liquid crystal developing a memory effect.

Figure 1:
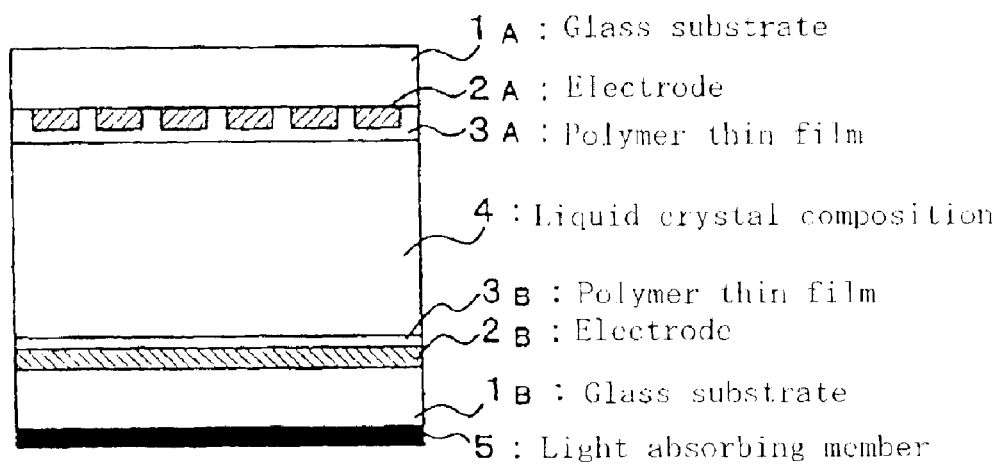
FIG. 1 is a cross-sectional view showing the schematic structure of a liquid crystal panel using a liquid crystal developing a memory effect.

In FIG. 1 is shown a schematic cross-sectional view of the liquid crystal display device according to the present invention. The liquid crystal display device shown in FIG. 1 is a liquid crystal panel, which includes glass substrates $1_A$, $1_B$, electrode groups $2_A$, $2_B$, polymer thin films $3_A$, $3_B$, a liquid crystal composition (a liquid crystal developing a memory effect) 4, and a black light-absorbing member 5 on a rear side, and which stably makes display in a focal conic state and a planar state. One of the electrode groups $2_A$, $2_B$ includes row electrodes (common electrodes), and the other includes column electrodes (segment electrodes). The following explanation will be made about a case wherein the electrode group $2_A$ includes row electrodes, and the electrode group $2_B$ includes column electrodes.

The polymer thin films $3_A$, $3_B$ may be formed from organic thin films, such as polyimide. Inorganic films, such as silica films, may be formed in place of the polymer thin films $3_A$, $3_B$. However, when the surfaces of the thin films in touch with the liquid crystal developing a memory effect are subjected to rubbing, the liquid crystal developing a memory effect loses the stability in the focal conic state, depending the kind of the thin films, in some cases. From this viewpoint, the thin films are formed without being subjected to rubbing, or the liquid crystal composition is provided so as to have direct contact with the electrode groups.

The gap between the electrode groups is kept by spacers or the like, and the gap is preferably 2 to 15 μm. The gap is more preferably 3 to 6 μm. This is because too small an electrode gap leads to a fall in contrast ratio in display and too large an electrode gap leads to an increase in driving voltages.

The display mode is dot-matrix display for instance. As long as the display mode includes scanning the common electrodes, non-full dot-matrix display, such as segment display, may be adopted. The substrates may be glass substrates or resin substrates. Or, each of the substrates may be a combination of a glass substrate and a resin substrate. When the panel is used as a reflective display, the light-absorbing member is provided on an inner or outer surface of one of the substrates, or a member having light-absorbing property is used as a substrate.

The spacers are sprayed on the electrode surfaces at a small amount, the four sides of the opposed substrates except for a filling port are sealed by an edge sealant made of, e.g., epoxy resin, and the liquid crystal composition is filed in the cell by vacuum filling.

Figure 2:
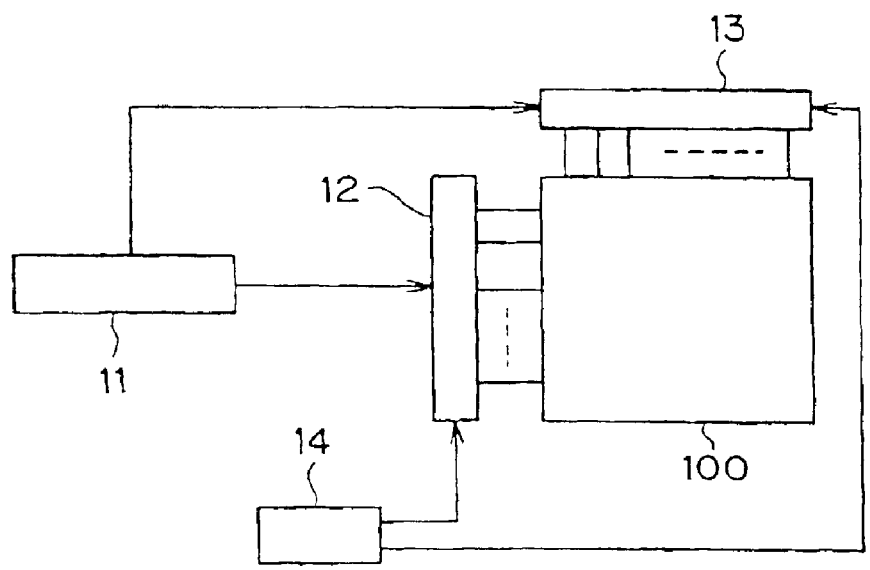
FIG. 2 is a block diagram showing an embodiment of the driving unit for driving a liquid crystal panel.

FIG. 2 is a block diagram showing an embodiment of the driving unit for driving the liquid crystal panel (liquid crystal display device). A controller 11 gives directions to a row driver 12 on voltage pulse inputs to the row electrodes and gives directions to a column driver 13 on voltage pulse inputs to the column electrodes. A liquid crystal power source 14 supplies necessary voltages to the row driver 12 and the column driver 13. The row driver 12 and the column driver 13 input voltage pulses into the row electrodes $2_B$ and the column electrodes $2_A$ according to directions from the controller 11. The controller 11 selectively transforms the liquid crystal developing a memory effect 4 into the planar state and the focal conic state by changing potentials applied to the respective electrodes. In the following explanation, the display in the planar state is referred to as ON-display, and the display in the focal conic state is referred to as OFF-display.

Now, the operation that is carried out to perform rewriting of display in the liquid crystal panel 100 will be explained.

First of all, the liquid crystal driving unit performs a-line-at-a-time scanning so as to select the row electrodes $2_B$ one by one and provides portions of the liquid crystal developing a memory effect 4 provided next to respective pixels with a voltage (voltage for transformation into ON-display), which transforms the liquid crystal into the planar state. When the voltage is applied, the liquid crystal 4 is changed into a homeotropic state. When the voltage application is completed, the liquid crystal 4 is transformed into the planar state, being brought into ON-display. Since the row electrodes $2_B$ are scanned to bring all pixels into ON-display, the screen as displayed up to now is erased. The liquid crystal driving unit scans the row electrodes $2_B$ at least one time so as to select the row electrodes $2_B$ one by one, bringing the entire screen into ON-display.

Subsequently, the liquid crystal driving unit performs a-line-at-a-time scanning of the row electrodes $2_B$ to provide desired row electrodes with a voltage corresponding to display data. Thus, the desired data is written, and the rewriting is completed. The liquid crystal driving unit scans the row electrodes at least one time to write display data.

It is assumed that $A_t$ (sec.) is a selection time period for each of the common electrodes when the voltage for bringing the liquid crystal developing a memory effect into ON-display is applied across the liquid crystal developing a memory effect. It is assumed that $A_n$ is a scan number for applying the voltage for bringing the liquid crystal developing a memory effect into ON-display across the liquid crystal developing a memory effect. It is also assumed that $W_t$ (sec.) is a selection time period for each of the common electrodes when the voltage corresponding to display data is applied across the liquid crystal developing a memory effect, and that $W_n$ is a scan number for applying the voltage corresponding to display data across the liquid crystal developing a memory effect.

Figure 3:
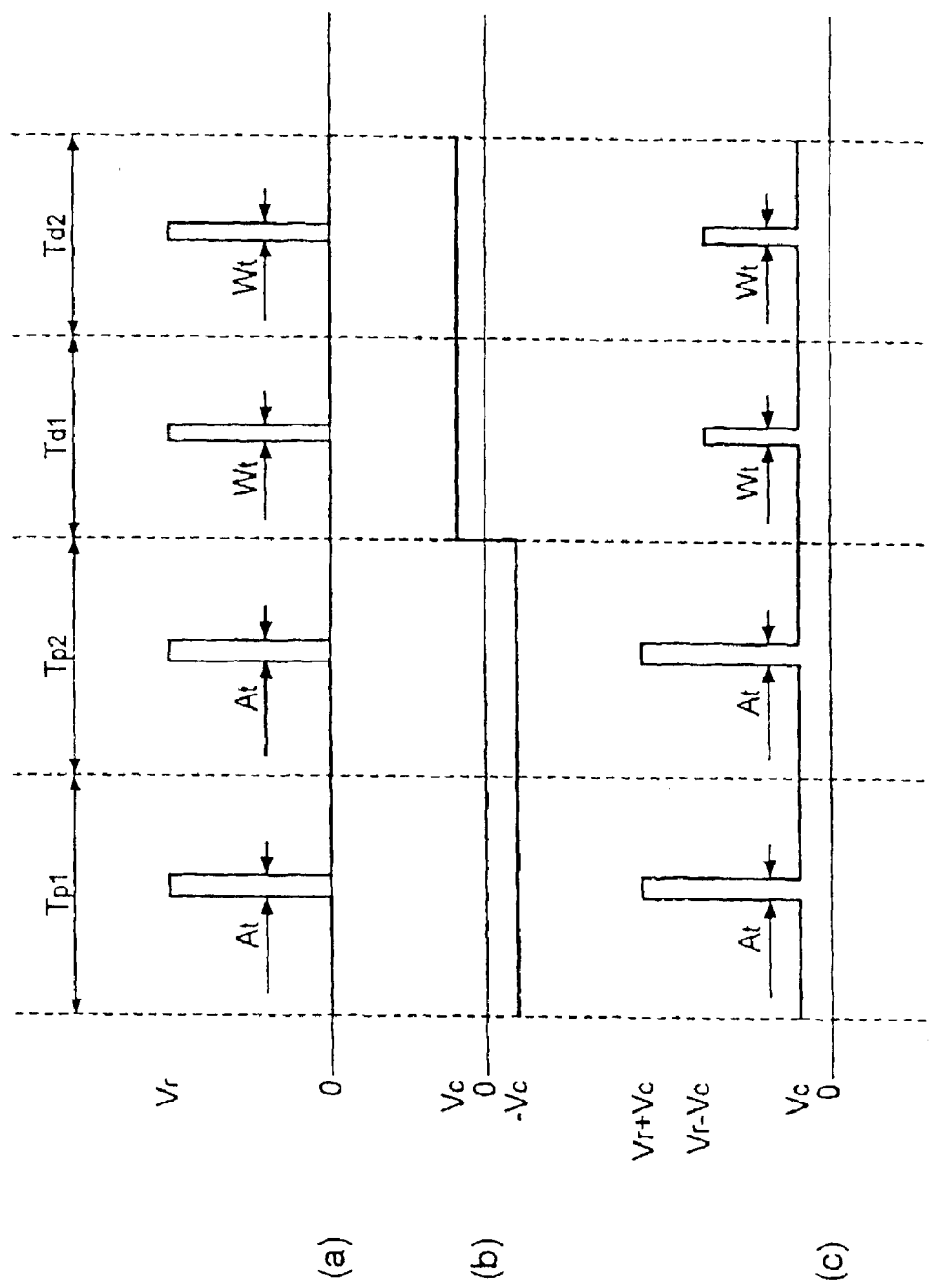
FIG. 3 is a schematic diagram showing embodiments of the driving waveforms at the time of rewriting display.

FIG. 3 is a schematic diagram showing an embodiment of the driving waveforms during the rewriting of display. In FIG. 3 is shown the embodiment in the case of $A_n=W_n=2$. In other words, it is shown the embodiment wherein the scanning for bringing the entire screen into ON-display and the scanning for writing display data are carried out at two times, respectively. Time periods $T_{p1}$, $T_{p2}$ indicate a first scanning time period and a second scanning time period for transformation into ON-display. Likewise, time periods $T_{d1}$, $T_{d2}$ indicate a first scanning time period and a second scanning time period for writing the display data.

FIG. 3(a) shows an embodiment of the driving waveforms applied to one row electrode $2_B$, and FIG. 3(b) shows an embodiment of the driving waveforms applied to one column electrode 2A. As shown in FIGS. 3(a) and 3(b), the row driver 12 applies the voltage pulse having a voltage amplitude $V_r$ into selected row electrodes $2_B$. The column driver 13 applies the voltage pulse having a voltage amplitude $V_c$ into the column electrode $2_A$. At that time, $V_r$ and $V_c$ are determined so as to meet the requirements of $V_r+V_c>V_p$, $V_r-V_c=V_F$ and $V_c<V_s$ as stated earlier. FIG. 3(c) shows the waveforms of the voltages, which are applied across the liquid crystal developing a memory effect 4 when the voltage pulses shown in FIGS. 3(a) and 3(b) are inputted.

In the time period $T_{p1}$, the row driver 12 sets the potential of selected row electrode $2_B$ at $V_r$ and the potential of non-selected row electrodes at 0. In the time period $T_{p1}$, the selection time period for the respective row electrodes $2_B$ is $A_t$. The column driver 13 sets the potential of all column electrodes $2_A$ at $-V_c$ in the time period $T_{p1}$. As a result, a voltage of $V_r+V_c$ is applied across portions of the liquid crystal developing a memory 4 that form the pixels of the selected row electrodes as shown in FIG. 3(c), and the pixels are brought into ON-display after completion of voltage application. A voltage of $V_c$ is applied across portions of the liquid crystal developing a memory 4 that form the pixels of the non-selected row electrodes. Even when the voltage of $V_c$ is applied, the display state of the pixels makes no change. The row driver 12 and the column driver 13 perform the same voltage application in the scanning step during the time period $T_{p2}$ as well.

Figure 4:
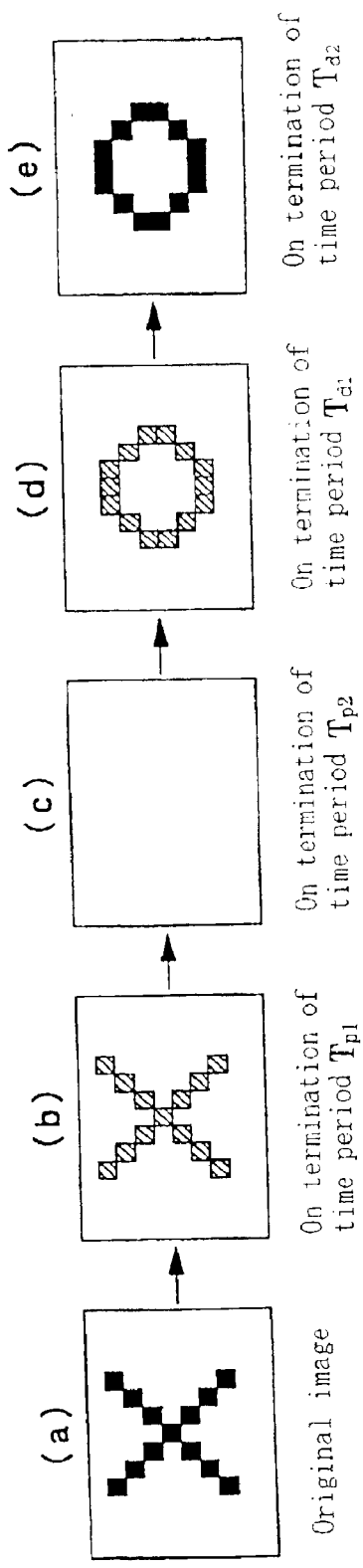
FIG. 4 is a schematic diagram showing embodiments of the changes in a screen at the time of rewriting display

FIG. 4 is schematic views showing an embodiment of changes in the screen at the time of rewriting display. It is assumed that the screen shown in FIG. 4(a) is displayed at first. When the first scanning for transformation into ON-display is performed in the time period $T_{p1}$, all pixels are brought into ON-display, and the display starts disappearing as shown in FIG. 4(b). When the second scanning is performed in the time period $T_{p2}$, the display gets more disappearable, and an afterimage disappears as shown in FIG. 4(c).

In the time period $T_{d1}$, the row driver 12 sets the potential of the selected row electrodes $2_B$ at $V_r$ and the potential of the non-selected row electrodes at 0. In the time period $T_{d1}$, the selection time period for the respective row electrodes $2_B$ is $W_t$. Additionally, the column driver 13 sets respective column electrodes $2_A$ at $V_c$ or $-V_c$, depending to the display data of the selected rows. As a result, a voltage of $V_r+V_c$ or $V_r-V_c$ is applied across portions of the liquid crystal developing a memory effect 4 for the respective pixels of the selected rows, and the respective pixels are transformed into ON-display or OFF-display. By performing scanning of the respective row electrodes $2_B$, rewriting into the desired display is made. The portions of the liquid crystal developing a memory effect 4 for the pixels of the non-selected rows have a voltage of $V_c$ applied thereacross. Even when the voltage of $V_c$ is applied, the display state of the pixels makes no change. The row driver 12 and the column driver 13 perform the voltage application in the scanning in the time period $T_{d2}$ as well.

In FIG. 3 is the case wherein the voltage $V_c$ is continuously applied to one row electrode 2A in the time periods $T_{d1}$, $T_{d2}$.

When scanning for writing display data is performed in the time period $T_{d1}$ after scanning in the time period $T_{p2}$, the desired display is written as shown in FIG. 4(d). When second scanning for writing the display data is performed in the time period $T_{d2}$, the contrast is further improved, and the writing of the display data is completed as shown in FIG. 4(e).

Although is shown the case (the case of $A_n=W_n=2$) wherein the scanning step for transformation into ON-display and the scanning step for writing display data are respectively performed two times, the number of each of the scanning steps is not limited to two times. For example, when the voltage of $V_r+V_c$ is set higher, or when the selection time period $A_t$ is set longer, an afterimage can be erased, as shown in FIG. 4(c), by performing the scanning step for transformation into ON-display only one time. Conversely, when the voltage of $V_r+V_c$ is set lower, or when the selection time period $A_t$ is set shorter, the number of the scanning step for erasing $A_n$ increases.

With regard to scanning for writing display data as well, when a voltage of $V_r+V_c$ is set higher, or when the selection time period $W_t$ is set longer, the writing of display data can be completed by single scanning. Conversely, when a voltage of $V_r+V_c$ is set lower, or when the selection time period $W_t$ is set shorter, the scan number for writing display data $W_n$ increases. When display data are written by performing scanning more than once, the difference between the contrast after first scanning and the contrast after second scanning is the greatest, and the degree of improvement in the contrast for third scanning and subsequent scanning is gradually decreasing.

When $V_r+V_c$ is set higher, or when the selection time period $A_t$ or the selection time period $W_t$ is set longer, the power consumption per one scanning step increases. When the selection time period $A_t$ or the selection time period $W_t$ is set longer, the time period required for one scanning step becomes longer.

It is preferable that the number of the scanning step for transformation into ON-display $A_n$ and the number of the scanning step for writing display data $W_n$ are determined such that $L(A_t \cdot A_n + W_t \cdot W_n)$ is included in a certain time period, provided that L is the total number of the row electrodes. The value of $L(A_t \cdot A_n + W_t \cdot W_n)$ is the time period from the start of the scanning step for transformation into ON-display to the completion of writing display data. In other words, it is possible to complete the rewriting of display data in a certain time period by determining $A_n$ and $W_n$ such that the value $L(A_t \cdot A_n + W_t \cdot W_n)$ is included in that time period. When the rewriting time period is beyond 60 sec., an operator, who works for rewriting display, usually feels too long. From this veiwpoint, it is preferable that $A_n$ and $W_n$ are determined such that the value of $L(A_t \cdot A_n + W_t \cdot W_n)$ is included within a period of 60 sec. In particular, when the number of the scanning step for writing display data $W_n$ is set at 1 or 2, the time period required for rewriting display data can be reduced. From this viewpoint, it is preferable to set $W_n$ at 1 or 2.

When the selection time periods $A_t$, $W_t$ for the respective row electrodes $2_B$ are equal each other in the scanning step for transformation into ON-display and the scanning step for writing display data, the controller 11, the row driver 12 and the column driver 13 can be fabricated in simpler fashion since it is enough to set the selection time periods at a single value. Likewise, when the scan numbers $A_n$ and $W_n$ are equal each other, the controller 11 or the like can be fabricated in simpler fashion. From the viewpoint of simplification in the controller 11 or the like, it is preferable that the selection times $A_t$, $V_t$ are set equal each other, or the scan numbers $A_n$, $W_n$ are set equal each other.

When $A_t \geq W_t$ is satisfied, it is possible to improve the contrast in written display to expand an allowable operational voltage. Now, explanation of the allowable operational voltage will be made. It is assumed that it is possible to obtain the best contrast by applying a voltage $V_1$ across a liquid crystal developing a memory effect for transformation into ON-display. However, even application of a voltage for transformation into ON-display, which is slightly deviated from $V_1$, can keep a good contrast. The allowable operational voltage means a voltage width wherein good contrasts can be kept around the voltage $V_1$. From the viewpoint of improving the contrast and the allowable operational voltage, it is preferable that $A_t \geq W_t$ is satisfied. It is particularly preferable that $A_t \geq 1.2 \cdot W_t$ is satisfied. When $A_t \geq 1.5 \cdot W_t$ is satisfied, it is possible to further improve the contrast and the allowable operational voltage.

After having brought the entire screen into ON-display, the entire screen may be brought into the OFF-display once, and then display data may be written. In that case, the liquid crystal driving unit performs the a-line-at-a-time scanning step for the row electrodes $2_B$ to apply a voltage for transforming portions of the liquid crystal developing a memory effect 4 provided in the respective pixels into the focal conic state (a voltage for transformation into OFF-display) across the respective liquid crystals after having performed the scanning step for transformation into ON-display. By the a-line-at-a-time scanning step, the entire screen is brought into the OFF-display since the portions of the liquid crystal developing a memory effect 4 for the respective pixels are brought into the focal conic state.

Figure 5:
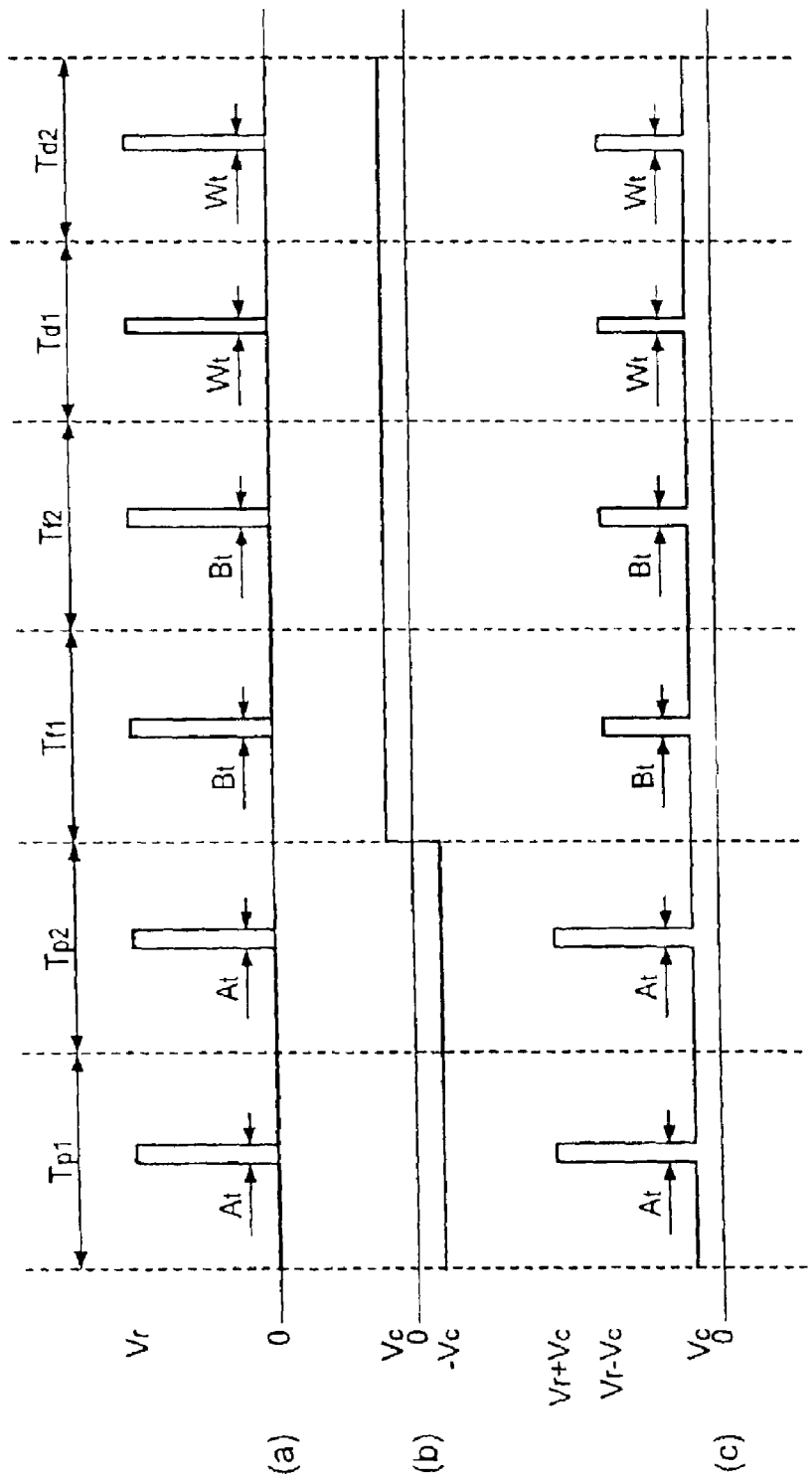
FIG. 5 is a schematic diagram showing embodiments of the driving waveforms at the time of rewriting display.

FIG. 5 is a schematic diagram showing an embodiment of the driving waveforms at the time of writing display data after having brought the entire screen into OFF-display. FIG. 5(a) shows an embodiment of the driving waveforms applied to one row electrode $2_B$, and FIG. 5(b) shows an embodiment of the driving waveforms applied to one column electrode $2_A$. FIG. 5(c) shows the waveforms of the voltages, which are applied to the liquid crystals developing a memory effect 4 when the voltage pulses shown in FIGS. 5(a) and 5(b) are input. The driving waveforms in the time periods $T_{p1}$, $T_{p2}$, $T_{d1}$, $T_{d2}$ shown in FIG. 5 are the same as those in the embodiment shown in FIG. 3. Time periods $T_{f1}$, $T_{f2}$ indicate a first scanning time period and a second scanning time period for transformation into OFF-display, respectively.

It is assumed that $B_t$(sec.) is a selection time period for each of the common electrodes when the voltage for bringing the liquid crystal developing a memory effect into OFF-display is applied across the liquid crystal developing a memory effect. It is also assumed that $B_n$ is a scan number for applying the voltage for bringing the liquid crystal developing a memory effect into OFF-display across the liquid crystal developing a memory effect. In FIG. 5 is shown the case of $B_n=2$.

In the embodiment shown in FIG. 5, the scanning step for transformation into ON-display is performed twice, i.e., in the two time periods $T_{p1}$, $T_{p2}$ to bring the entire screen into ON-display. Subsequently, the row driver 12 sets selected row electrodes $2_B$ at a voltage of $V_1$ and non-selected row electrodes at a voltage of 0 in the time period $T_{f1}$. The column driver 13 sets all column electrodes $2_A$ at a voltage of $V_c$ in the time period $T_{f1}$. As a result, portions of the liquid crystal developing a memory effect 4 provided in the pixels of the selected rows have a voltage of $V_r-V_c$ applied thereacross as shown in FIG. 5(c), and the portions of the liquid crystal provided at the selected row electrodes are brought into the focal conic state. In other words, the pixels of the selected rows are brought into OFF-display. The portions of the liquid crystal developing a memory effect 4 provided in the pixels of the non-selected rows have a voltage of $V_c$ applied thereacross. Even when the voltage $V_c$ is applied, the display state of the pixels makes no change. The row driver 12 and the column driver 13 perform the same voltage application in the scanning step during the time period $T_{f2}$ as well.

The entire screen is brought into OFF-display by the scanning step in each of the time periods $T_{f1}$, $T_{f2}$. Subsequently, desired display is written by the scanning step in each of the time periods $T_{d1}$, $T_{d2}$.

When the scanning step for transformation into OFF-display is performed after the scanning step for transformation into ON-display has been performed, the contrast after rewriting of display data is improved. From this viewpoint, in order to improve the contrast, it is preferable that the scanning step for transformation into OFF-display is performed.

The number of the scanning step for transformation into OFF-display is not limited to two times. When the selection time period $B_t$ for the respective row electrodes $2_B$ is set longer, the entire screen can be brought into OFF-display by performing the scanning step for transformation into OFF-display one time. Conversely, when the selection time period $B_t$ is set shorter, the number of the scanning step for bringing the entire screen into OFF-display $B_n$ increases.

In this embodiment, it is preferable that $A_n$, $B_n$ and $W_n$ are determined such that a value of $L(A_t \cdot A_n + B_t \cdot B_n + W_t \cdot W_n)$ is included in a certain time period. It is particularly preferable that $A_n$, $B_n$ and $W_n$ are determined such that the value of $L(A_t \cdot A_n + B_t \cdot B_n + W_t \cdot W_n)$ is within the period of 60 sec. The value of $L(A_t \cdot A_n + B_t \cdot B_n + W_t \cdot W_n)$ is a time period from the start of the scanning step for transformation into ON-display to the completion of writing display data. In other words, rewriting can be completed within a period of 60 sec. by determining $A_n$, $B_n$ and $W_n$ such that the value of $L(A_t \cdot A_n + B_t \cdot B_n + W_t \cdot W_n)$ is included within a period of 60 sec. In particular, when the number of the scanning step for writing display data $W_n$ is set at 1 or 2, the time period required for rewriting display data can be reduced. From this viewpoint, it is preferable to set $W_n$ at 1 or 2.

In this embodiment as well, when the selection time periods or the scan numbers are set at a single value, the controller 11, the row driver 12 and the column driver 13 can be fabricated in simpler fashion. From the viewpoint of simplification in the controller 11 or the like, it is preferable that the selection times $A_t$, $B_t$ and $W_t$ are set equal each other, or the scan numbers $A_n$, $B_n$ and $W_n$ are set equal each other.

In this embodiment as well, it is preferable from the viewpoint of improving the contrast and the allowable operational voltage that $A_t \geq W_t$ is satisfied. It is particularly preferable that $A_t \geq 1.2 \cdot W_t$ is satisfied. When $A_t \geq 1.5 \cdot W_t$ is satisfied, it is possible to further improve the contrast.

The driving method to bring the entire screen into ON-display and then write display data without bringing the entire screen into OFF-display as shown in FIG. 3 corresponds to the case of Bn=0 in this embodiment.

In accordance with the driving methods referred to in the respective embodiments, an afterimage can be erased since all pixels are brought into ON-display or OFF-display before new display is written. No load is applied to the row driver 21 since when all pixels are brought into ON-display or OFF-display, the scanning step is performed so as to select the row electrodes $2_B$ one by one.

The explanation of the respective embodiments has been made with respect to the case wherein the voltage amplitudes of the voltage pulses inputted into the row electrodes $2_B$ and the column electrodes $2_A$ are, respectively, set at constant values $V_r$, $V_c$. In the scanning step for transformation into ON-display, the scanning step for transformation into OFF-display or the scanning step for writing display data, the voltage amplitudes of the voltage pulses may be modified.

For example, the scanning step for writing display data may be performed by setting the voltage amplitudes to row electrodes $2_B$ and column electrodes $2_A$ at $V_r$, $V_c$, respectively, and applying a voltage of $V_r + V_c$ or $V_r - V_c$ across respective pixels. In that case, the scanning step for transformation into ON-display may be performed by setting the voltage amplitudes at a voltage other than $V_r$ and $V_c$, and applying a voltage different from $V_r + V_c$ across the liquid crystal developing a memory effect to bring the entire screen into ON display. Likewise, the scanning step for transformation into OFF-display may be performed by setting the voltage amplitudes at a voltage other than $V_r$ and $V_c$, and applying a voltage different from $V_r - V_c$ across the liquid crystal developing a memory effect to bring the entire screen into OFF display. In the following explanation, the voltage applied across the liquid crystal developing a memory effect in the scanning step for transformation into ON-display is denoted as $A_v$, and the voltage applied across the liquid crystal developing a memory effect in the scanning step for transformation into OFF-display is denoted as $B_v$.

It should be noted that the voltage for transforming the liquid crystal developing a memory effect into the planar state is higher than the voltage for transforming the liquid crystal developing a memory effect into the focal conic state. Accordingly, the voltage for bringing the liquid crystal developing a memory effect into ON display $A_v$ is set higher than the voltage for bringing the liquid crystal developing a memory effect into OFF display $B_v$. By applying the voltage $B_v$ lower than the voltage $A_v$ to bring the entire screen into OFF display after having applied the voltage $A_v$ to bring the entire screen into ON display, it is possible to obtain the contrast and the allowable operational voltage in good fashion after having written display data.

Although the explanation of the respective embodiments stated earlier has been made with respect to the case of performing a-line-at-a-time addressing, the scanning step for the row electrodes $2_B$ is not limited to a-line-at-a-time addressing.

Figure 6:
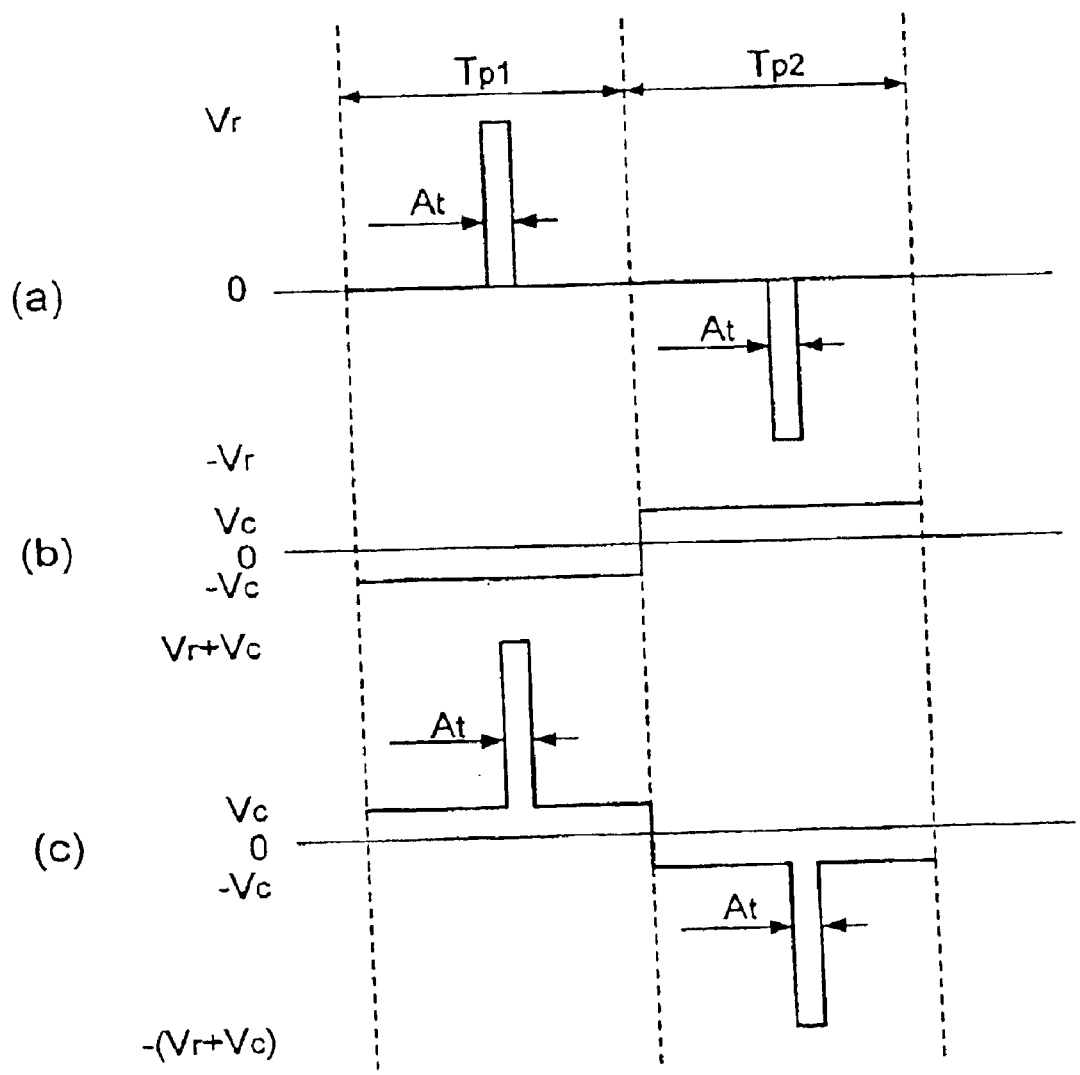
FIG. 6 is a schematic diagram showing embodiments of the reversal of the polarities in every scanning.

In the respective embodiments, the polarities may be reversed for every scanning to perform the application of the voltages to the liquid crystal developing a memory effect 4. Specifically, the application of the voltages may be performed by reversing the relationship between the potential of the row electrodes $2_B$ and the potential of the column electrodes $2_A$ in terms of height for every scanning. FIG. 6 shows an example of the driving waveforms in a case wherein the polarities are reversed for every scanning to perform the step for transformation into ON-display. FIGS. 6 (a) and 6 (b) show the driving waveforms, which are respectively applied to one row electrode 2B and one column electrode 2A. FIGS. 6 (c) shows the driving waveforms, which are applied across the liquid crystal developing a memory effect 4. In FIG. 6 (c), the voltage that is established when the potential of the row electrodes $2_B$ is set higher than the potential of the column electrodes $2_A$ is shown as positive, and the voltage that is established when the potential of the row electrodes $2_B$ is set lower than the potential of the column electrodes $2_A$ is shown as negative.

As shown in FIG. 6, when the potential of the row electrodes $2_B$ selected in the first scanning step is set at $V_r$, the potential of the row electrodes $2_B$ selected in the next scanning step is set at $-V_r$. On the other hand, when the potential to column electrodes $2_A$ is set at $-V_c$ in the first scanning step, the potential is set at $V_c$ in the second scanning step. Thus, a voltage of $V_r + V_c$ is applied across portions of the liquid crystal developing a memory effect next to the selected rows in the first scanning step, and a voltage of $-(V_r + V_c)$ is applied across portions of the liquid crystal developing a memory effect next to the selected rows in the second scanning step. Reversing the polarities may be repeated as in this manner to perform the application of the voltages. Reversing the polarities for every scanning may also be performed in the scanning for transformation into OFF display or the scanning step for writing display data.

Figure 7:
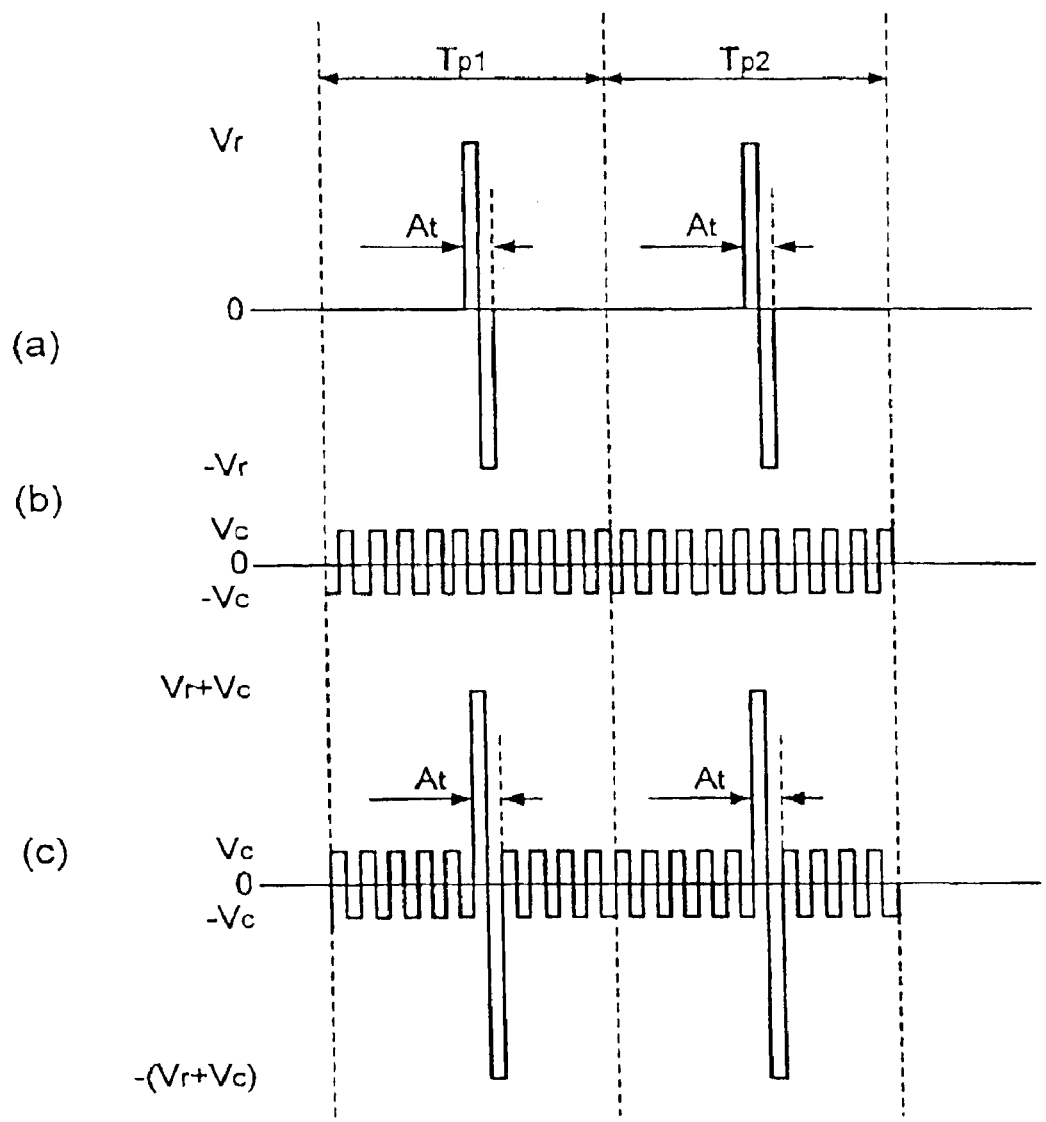
FIG. 7 is a schematic diagram showing embodiments of the reversal of the polarities in selection time periods.

Additionally, the polarities may be reversed in the selection time periods for respective row electrodes $2_B$. Specifically, the application of the voltages may be performed while the relationship between the potential of the row electrodes $2_B$ and the potential of the column electrodes $2_A$ in terms of height is being reversed in a single selection time period. FIG. 7 shows an example of the driving waveforms in a case wherein the polarities are reversed in the selection time periods in the scanning step for transformation into ON display. FIGS. 7 (a) and 7 (b) show the driving waveforms, which are respectively applied to one row electrode 2B and one column electrode $2_A$. FIGS. 7 (c) shows the driving waveforms, which are applied across the liquid crystal developing a memory effect. As shown in FIG. 7, the potential of a selected row electrode $2_B$ is alternately reversed from $V_r$ to $-V_1$ in the selection time periods $A_r$. Accordingly, voltages of $V_r+V_c$ and $-(V_r+V_c)$ are alternately applied across the portions of the liquid crystal developing a memory effect next to selected rows. The polarities may be reversed in this manner. Reversing the polarities as just stated may also be performed in the scanning for transformation into OFF display or the scanning step for writing display data.

The reversal of the polarities in the selective time period leads to an increase in power consumption. However, the polarities can be reversed in the selective time period to prevent a stripe from appearing on a screen. From this viewpoint, in order to improve the appearance at the time of rewriting display, it is preferable to reverse the polarities in the selection time period in the scanning step for writing display data.

Now, examples of the present invention will be described.

EXAMPLE 1

A glass substrate with 240 transparent stripe electrodes formed thereon and a glass substrate with 320 transparent stripe electrodes formed thereon were fabricated. The respective glass substrates had inorganic thin films formed on the surfaces in touch with the liquid crystal layer. Then, resin spacers having a diameter of 4 μm were sprayed on the upper and lower substrates. A hollow cell was formed by overlapping both glass substrates with printed epoxy resin having a width of about 0.4 mm interposed at the four sides except for a filling port therebetween so that the stripe electrodes intersect.

A chiral nematic liquid crystal composition (hereinbelow, referred as to the liquid crystal A) was formulated from 70.8 parts by mass of a commercially available nematic liquid crystal ("MJ00423" manufactured by Merck Japan: Tc=94.0° C., Δn=0.230 and Δε=15.0), 14.6 parts by mass of a chiral agent represented by Chemical Formula 1, and 14.6 parts by mass of a chiral agent represented by Chemical Formula 2.

(Chemical Formula 1)

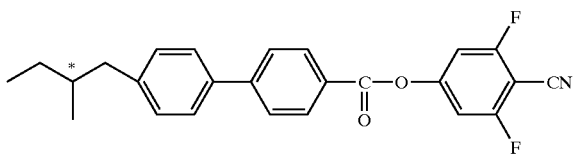

(Chemical Formula 2)

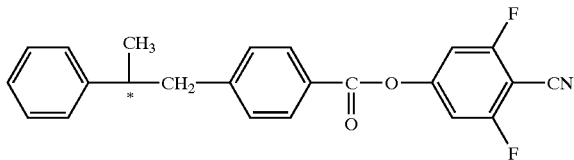

As before-mentioned, the pitch p is determined according to the formula of p=1/(c·HTP) based on the adding amount c of an optionally active material, such as a chiral agent, and the constant of the optionally active material HTP (Helical Twisting Power).

So it is possible to adjust the selective reflective wavelength of a chiral liquid crystal display element to be in the IR, UV or visible wavelength region.

A liquid crystal panel was fabricated by filling the liquid crystal A into the already-fabricated empty cell by vacuum filling and sealing the filling port with an ultraviolet-cured sealant. In the liquid crystal panel thus fabricated, the 240 transparent stripe electrodes were set so as to work as row electrodes, the 320 transparent stripe electrodes were set so as to work as column electrodes, and a row driver and a column driver were connected to the row electrodes and the column electrodes, respectively. In this example, a waveform generator for generating a desired waveform manufactured by Sun Water Kabushiki Kaisha was used as a driving unit with the row driver and the column driver included therein.

FIG. 8 shows combination examples of driving parameters and the measurements on, e.g., contrasts in the respective examples. As shown in FIG. 8, the liquid crystal panel was driven with the scan number for transformation into ON display set at $A_n$, the voltage for bringing the liquid crystal developing a memory effect into ON display set at $A_v$, the scan number for transformation into OFF display set at $B_n$, the voltage for bringing the liquid crystal developing a memory effect into OFF display set at $B_v$, the scan number for writing display data set at $W_n$, and the selection time periods $A_t$, $B_t$, $W_t$ changed. In the scanning step for writing display data, the voltage amplitude $V_r$ applied to row electrodes was set at 16 V, and the voltage amplitude $V_c$ applied to column electrodes was set at 2 V. In other words, in the scanning step for writing display data, a voltage of $V_r+V_c=18$ V was applied across portions of the liquid crystal to be brought into ON display, and a voltage of $V_r-V_c=14$ V was applied across portions of the liquid crystal to be brought into OFF display.

The time periods for rewriting display and the contrasts in the respective combinations of the parameters were measured, and whether an afterimage is left after having rewritten display was checked out. The measurements are shown in FIG. 8. In each of the respective combinations of the parameters shown in FIG. 8, the time period for rewriting display was not longer than 60 sec. In each of the combinations, contrasts not lower than 6 could be realized, and no afterimage was recognized.

COMPARATIVE EXAMPLE 1

Figures 9, 10, 11:
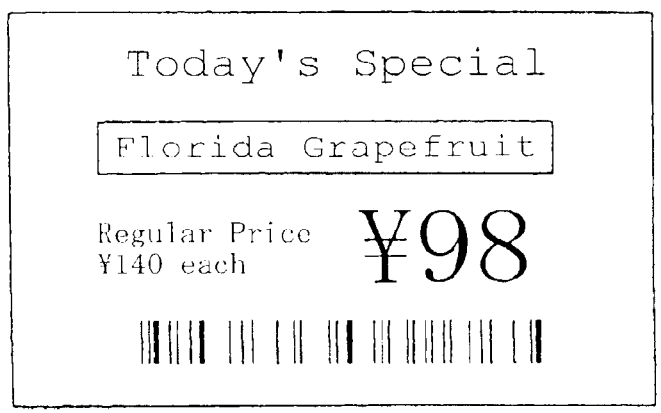
FIG. 9 is a Table showing the set parameters and the measurements in Comparative Examples.
FIG. 10 is a Table showing the measurements of contrasts and allowable operational voltages, which were detected with the ratio between selection time periods changed.
FIG. 11 is a schematic view showing an embodiment of the information displayed on the liquid crystal panel.

Display was rewritten without performing the scanning step for transformation into ON display and the scanning for transformation into OFF display. The combinations of the parameters and the measurements in the comparative example are shown in FIG. 9. As shown in FIG. 9, the scan number for writing display data $W_n$ was changed. The selection time period $W_t$ was set at 20 ms. As shown in FIG. 9, the contrasts were lower than those in Example 1, and an afterimage was recognized in each of the combinations in the comparative example.

The results of Example 1 and Comparative Example 1 reveal that it is possible to obtain display without an afterimage and with a higher contrast by performing the scanning step for brining the entire screen into ON display or OFF display, and then performing the scanning step for writing display data.

Additionally, the liquid crystal panel was driven with the voltage $A_v$ set at 18 V and the voltage of $V_r+V_c$ also set at 18 V. Contrasts and allowable operational voltages after rewriting of display were measured with the ratio of the selection time period $A_t$ to the selection time period $W_t$ changed. The measurements are shown in FIG. 10. The measurements reveal that it is possible to further improve the contrast and to further expand the allowable operational voltage by setting the selection time period $A_t$ longer than the selection time period $W_t$.

Next, a possible use of the liquid crystal display device driven by the driving method according to the present invention will be described. Retail stores have stuck a label with, e.g., the retail price of an item shown thereon (hereinbelow, referred as to the shelf label) to the product shelve. The liquid crystal display device driven by the driving method according to the present invention may be used as the shelf label. In FIG. 11 is shown an example of information that is displayed by the liquid crystal display device used as a shelf label. When information, such as a price, changes daily, the information can be rewritten to new display by the driving method according to the present invention. Even when the information shown in FIG. 11 is rewritten, new information is free from having information, such as "¥98", left as an afterimage. In the case of display being 9 cm high and 11 cm wide, the display shown in FIG. 11 can be written by 240 row electrodes and 320 column electrodes for instance. The size of one pixel in that case is 0.33 mm high and 0.33 mm wide.

The following Table 1 shows some other combinations of parameters such as An, Bn, and Wn in the present invention.

TABLE 1

| Combination | An | Bn | Wn |
| --- | --- | --- | --- |
| A1 | 1 | 0 | 2 |
| A2 | 0 | 0 | 4–16 |
| A3 | Note 1 | Note 1 | 1 |
| A4 | Note 1 | Note 1 | 2 |
| A5 | Note 1 | 0 | Note 1 |
| A6 | An = Wn | 0 | An = Wn |
| A7 | | An = Bn = Wn | |

Note 1
A Relation of "L(At · An + Bt · Bn + Wt · Wn) ≦ 60 second" is satisfied.

In accordance with the first aspect of the present invention, it is possible to rewrite display within a certain time period without leaving an afterimage, and to prevent a load from being applied to the row driver or the column driver. It is also possible to perform display with a good contrast. In accordance with the second aspect, it is possible to complete the rewriting within a period of 60 seconds. In accordance with the third aspect, it is possible to make the driving unit simpler since $A_t=B_t=W_t$ is satisfied. In accordance with the fourth aspect, it is possible to make the driving unit simpler since $A_n=B_n=W_n$ is satisfied.

Even in the case of $B_n=0$ in accordance with the fifth aspect, it is possible to rewrite display within a certain time period without leaving an afterimage, and to prevent a load from being applied to the row driver or the column driver. In accordance with the sixth aspect, it is possible to make the driving unit simpler since $B_n=0$ and $A_n=W_n$ are satisfied.

In accordance with the seventh aspect, it is possible to improve the contrast and to expand the allowable operational voltage since $A_t \geq W_t$ is satisfied. In accordance with the eighth aspect, it is possible to further improve the contrast and to further expand the allowable operational voltage since $A_t \geq 1.2 \cdot W_t$ is satisfied. In accordance with the ninth aspect, it is possible to reduce the time period required up to completion of rewriting of display since $W_n$ is set at 1 or 2.

The entire disclosures of Japanese Patent Application No. 2001-297783 filed on Sep. 27, 2001 and Japanese Patent Application No. 2001-285979 filed on Sep. 19, 2002 including specifications, claims, drawings and summaries are incorporated herein by reference in their entireties.

What is claimed is:

1. A method for driving a liquid crystal display device including a memory type liquid crystal layer that exhibits at least two stable states, a plurality of common electrodes and a plurality of segment electrodes, wherein the common electrodes are scanned so as to be selected a-line-at-a-time, characterized in that An, Bn and Wn being determined such that L·(At·An+Bt·Bn+Wt·Wn) is not longer than a certain time period, and the voltage for making said layer into on-display being set higher than the voltage for making said layer into off-display;

where L is a total number of the common electrodes,

At (sec) is a selection time period for each of the common electrodes when the voltage making said layer into on-display is applied to said layer, An is a scan number for applying the voltage for making said layer into on-display at least one time, scanning the common electrodes so as to select all common electrodes on by one, Bt (sec) is a selection time period for each of the common electrodes when the voltage for making said layer into off-display is applied so said layer, Bn is a scan number for applying the voltage for making said layer into off-display, Wt (sec) is a selection time period for each of the common electrodes when the voltage corresponding to a display data is applied to said layer, and Wn is a scan number for applying the voltage corresponding to a display data to said layer, an on-voltage to make said layer into on-display is set to be higher than an off-voltage to make said layer into off-display, an on-voltage is applied to said layer, and an off-voltage is applied to said layer, and a voltage corresponding to a display data is applied to said layer.

2. The method for driving a liquid crystal display device according to claim 1, wherein L·(At·An+Bt·Bn+Wt·Wn) is less than or equal to 60 seconds.

3. The method for driving a liquid crystal display device according to claim 1,
wherein $At=Bt=Wt$ is satisfied.

4. The method for driving a liquid crystal display device according to claim 1,
wherein $An=Bn=Wn$ is satisfied.

5. The method for driving a liquid crystal display device according to claim 1,
wherein $Bn=0$ is satisfied and off-voltage is not applied to said layer.

6. The method for driving a liquid crystal display device according to claim 1,
wherein $Bn=0$ and $An=Wn$ are satisfied.

7. The method for driving a liquid crystal display device according to claim 1,
wherein $At \geq Wt$ is satisfied.

8. The method for driving a liquid crystal display device according to claim 1,
wherein $At \geq 1.2Wt$ is satisfied.

9. The method for driving a liquid crystal display device according to claim 1,
wherein $At \geq 1.5Wt$ is satisfied.

10. The method for driving a liquid crystal display device according to claim 1,
wherein Wn is 1.

11. The method for driving a liquid crystal display device according to claim 1,
wherein Wn is 2.

12. The method for driving a liquid crystal display device according to claim 1,
wherein An is 2 and Bn is 0 and Wn is 2.

13. The method for driving a liquid crystal display device according to claim 1,
wherein An is 1 and Bn is 1 and Wn is 1.

14. The method for driving a liquid crystal display device according to claim 1,
wherein An is 4 and Bn is 2 and Wn is 4.

15. The method for driving a liquid crystal display device according to claim 1,
wherein An is 1 and Bn is 0 and Wn is 2.

16. The method for driving a liquid crystal display device according to claim 1,
wherein An is 0 and Bn is 0 and Wn is from 4 to 16.

17. The method for driving a liquid crystal display device according to claim 1,
wherein said layer is comprised of a chiral nematic liquid crystal material.

18. The method for driving a liquid crystal display device according to claim 1,
wherein an visible wavelength is included in a selective-reflective region by said layer in planar state.

19. The method for driving a liquid crystal display device according to claim 1,
wherein an infrared wavelength is included in a selective-reflective region by said layer in a planar state.

20. The method for driving a liquid crystal display device according to claim 1,
wherein an ultraviolet wavelength is included in a selective-reflective region by said layer in a planar state.

* * * * *